United States Patent [19]

Okumura et al.

[11] Patent Number: 5,650,480
[45] Date of Patent: Jul. 22, 1997

[54] PROCESS FOR PREPARING POLYCARBONATE

[75] Inventors: Ryozo Okumura, Sodegaura; Shigeki Kuze, Ichihara; Seiji Takahashi, Sodegaura, all of Japan

[73] Assignee: Idemitsu Petrochemical Co., Ltd., Tokyo, Japan

[21] Appl. No.: 569,131

[22] PCT Filed: Jul. 5, 1994

[86] PCT No.: PCT/JP94/01090

§ 371 Date: Jan. 11, 1996

§ 102(e) Date: Jan. 11, 1996

[87] PCT Pub. No.: WO95/02006

PCT Pub. Date: Jan. 19, 1995

[30] Foreign Application Priority Data

Jun. 7, 1993 [JP] Japan ................................ 5-166943

[51] Int. Cl.⁶ .................................................. C08G 64/00
[52] U.S. Cl. ............................ 528/196; 526/59; 528/198
[58] Field of Search ...................................... 528/196, 198; 526/59

[56] References Cited

U.S. PATENT DOCUMENTS

| 5,349,042 | 9/1994 | Kuze et al. | 528/196 |
| 5,459,225 | 10/1995 | Kuze et al. | 528/196 |

FOREIGN PATENT DOCUMENTS

| 1374030 | 8/1964 | France . |  |
| 4240587 | 6/1994 | Germany . |  |
| 0436346 | 2/1992 | Japan | 528/196 |

*Primary Examiner*—Terressa Mosley
*Attorney, Agent, or Firm*—Oblon, Spivak, McClelland, Maier & Neustadt, P.C.

[57] ABSTRACT

The present invention is directed to a process for preparing a polycarbonate in accordance with an ester exchange reaction of a dihydroxy compound (A) and a carbonic acid diester (B) by adjusting, to 2 ppm or less, the concentration of oxygen in an atmosphere in which the ester exchange reaction is carried out.

According to the present invention, there can efficiently be prepared the polycarbonate which is free from residence burn and which is excellent in hydrolysis resistance and color tone.

15 Claims, No Drawings

PROCESS FOR PREPARING POLYCARBONATE

TECHNICAL FIELD

The present invention relates to a process for preparing a polycarbonate. More specifically, it relates to a process for efficiently preparing a polycarbonate, which is free from residence burn and excellent in quality and color tone, without impairing its hydrolysis resistance from a dihydroxy compound and a carbonic acid diester in accordance with an ester exchange method by adjusting the concentration of oxygen in an atmosphere where the ester exchange is carried out.

BACKGROUND ART

In general, as methods for preparing a polycarbonate (hereinafter referred to as "PC"), there are known a method which comprises directly reacting an aromatic dihydroxy compound such as bisphenol A with phosgene (an interfacial method), and another method which comprises carrying out an ester exchange reaction between an aromatic dihydroxy compound such as bisphenol A and a carbonic acid diester such as diphenyl carbonate in a melting state (a melting method).

In the PC preparation methods, the above-mentioned interfacial method has some problems. For example, (1) harmful phosgene must be used, (2) chlorine-containing compounds such as hydrogen chloride and sodium chloride as by-products accelerate the corrosion of the manufacturing apparatus, and (3) it is difficult to separate impurities such as sodium hydroxide with which the resin is contaminated and which has a harmful influence on the physical properties of the polymer.

On the other hand, the above-mentioned melting method has an advantage that the PC can be manufactured more inexpensively as compared with the interfacial method. In the melting method, however, the reaction is done at a high temperature of 280° to 310° C. for a long period of time, and therefore this method has a large drawback that a problem regarding the coloring of the resin is unavoidable.

In such a melting method, various improved techniques have been suggested in order to decrease this coloring phenomenon. For example, Japanese Patent Publication No. 39972/1986 and Japanese Patent Application Laid-open No. 223036/1988 have disclosed methods using specific catalysts. Furthermore, Japanese Patent Application Laid-open Nos. 151236/1986 and 158719/1987 have disclosed methods in which an antioxidant is added in the second half of reaction. Moreover, in Japanese Patent Application Laid-open No. 62522/1986, the use of a twin-screw bent type kneading extruder in the second half of reaction has been disclosed, and in Japanese Patent Application Laid-open No. 153925/1990, an improved technique regarding a process has been disclosed in which a transverse type stirring polymerizer is used. Additionally, in Japanese Patent Application Laid-open No. 175722/1990, a method has been disclosed in which the content of hydrolyzable chlorine in a monomer is controlled to a certain level or less.

However, the problem of the coloring has not completely been solved yet, and a technique for obtaining the satisfactory PC has not been attained so far.

DISCLOSURE OF THE INVENTION

Under the above-mentioned circumstances, the present inventors have intensively researched with the intention of improving an ester exchange process by which the drawbacks of the above-mentioned conventional methods can be solved and the PC having an excellent color tone can efficiently be prepared.

As a result, it has been found that the above-mentioned problems can be solved by adjusting the concentration of oxygen in an atmosphere where an ester exchange reaction is carried out, when the PC is prepared by the ester exchange process. In consequence, the present invention has been completed on the basis of such a knowledge.

That is to say, according to the present invention, there can be provided a process for preparing a polycarbonate from a dihydroxy compound (A) and a carbonic acid diester (B) in accordance with an ester exchange method, said process comprising the step of adjusting, to 2 ppm or less, the concentration of oxygen in an atmosphere where an ester exchange reaction is carried out.

BEST MODE FOR CARRYING OUT THE INVENTION

First, in the present invention, various kinds of dihydroxy compounds can be used as a component (A). For example, the dihydroxy compound is at least one compound selected from the group consisting of aromatic dihydroxy compounds, aliphatic dihydroxy compounds, bisesters of the aromatic dihydroxy compounds, bisesters of the aliphatic dihydroxy compounds, carbonates of the aromatic dihydroxy compounds and carbonates of the aliphatic dihydroxy compounds.

The aromatic dihydroxy compound which can be used as one of the component (A) is an aromatic dihydroxy compound represented by the general formula (I)

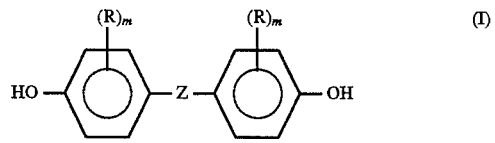

wherein R is a halogen atom (e.g., chlorine, bromine, fluorine or iodine), an alkyl group having 1 to 8 carbon atoms (e.g., a methyl group, an ethyl group, a propyl group, an n-butyl group, an isobutyl group, an amyl group, an isoamyl group or a hexyl group), and when a plurality of Rs are present, they may be the same or different; m is an integer of 0 to 4; and Z is a single bond, an alkylene group having 1 to 8 carbon atoms, an alkylidene group having 2 to 8 carbon atoms (e.g., a methylene group, an ethylene group, a propylene group, a butylene group, a pentylene group, a hexylene group, an ethylidene group or an isopropylidene group), a cycloalkylene group having 5 to 15 carbon atoms, a cycloalkylidene group having 5 to 15 carbon atoms (e.g., a cyclopentylene group, a cyclohexylene group, a cyclopentylidene group or a cyclohexylidene group), —S—, —SO—, —SO$_2$—, —O—, —CO—, or a group represented by the general formula (II) or (II')

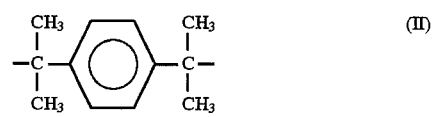

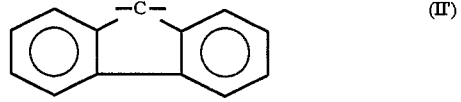

Typical examples of such an aromatic dihydroxy compound include bis(hydroxyaryl)alkanes such as bis(4- hydroxyphenyl)methane, 1,1-bis(4-hydroxyphenyl)ethane, 2,2-bis(4-hydroxyphenyl)propane (popular name bisphenol A:BPA), 2,2-bis(4-hydroxyphenyl)butane, 2,2-bis(4-hydroxyphenyl)octane, 2,2-bis(4-hydroxyphenyl) phenylmethane, 2,2-bis(4-hydroxy-1-methylphenyl) propane, 1,1-bis(4-hydroxy-t-butylphenyl)propane, 2,2-bis (4-hydroxy-3-bromophenyl)-propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)-cyclohexane and 1,1-bis(4-hydroxyphenyl)-3,5,5-trimethylcyclohexane; dihydroxyaryl ethers such as 4,4-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxyaryl sulfoxides such as 4,4'-dihydroxydiphenyl sulfoxide and 4,4'-dihydroxy-3,3'-dimethyldiphenyl sulfoxide; dihydroxydiarylsulfonic acids such as 4,4'-dihydroxydiphenyl sulfone and 4,4'-dihydroxy-3,3'-dimethyldiphenyl sulfone; dihydroxybenzenes; halogen- and alkyl-substituted dihydroxybenzenes such as 1,4-dihydroxy-2,5-dichlorobenzene and 1,4-dihydroxy-3-methylbenzene.

As the aliphatic dihydroxy compound which is one of the component (A), various compounds are usable. Typical examples of the aliphatic dihydroxy compound include 1,4-butanediol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcyclohexane, p-xylylene glycol, 2,2-dis(4-hydroxycylohexyl)propane, ethoxyl and propoxy compounds of divalent alcohols and phenols such as bis-oxyethyl-bisphenol A, bis-oxyethyl-tetrachlorobisphenol A and bis-oxyethyl-tetrachlorohydoquinone.

Of the bisesters of the aromatic dihydroxy compounds, the bisesters of the aliphatic dihydroxy compounds, the carbonates of the aromatic dihydroxy compounds and the carbonates of the aliphatic dihydroxy compounds which can be used as the component (A), examples of the bisesters include a compound represented by the general formula (III)

$$R^2CO-R^1-OCR^2 \quad (III)$$

(with C=O groups)

wherein $R^1$ is a residue of the above-mentioned aliphatic dihydroxy compound from which two hydroxy groups are removed; and $R^2$ is an alkyl group having 1 to 6 carbon atoms or a cycloalkyl group having 4 to 7 carbon atoms, a compound represented by the general formula (IV)

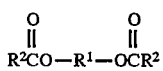
$$(IV)$$

wherein $Ar^1$ is a residue of the above-mentioned aromatic dihydroxy compound from which two hydroxy groups are removed; and $R^2$ is the same as defined above, a compound represented by the general formula (V)

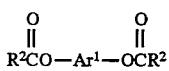
$$(V)$$

wherein $Ar^2$ is an aryl group; and $R^1$ is the same as defined above, and a compound represented by the general formula (VI)

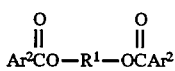
$$(VI)$$

wherein $Ar^1$ and $Ar^2$ are the same as defined above.

Examples of the carbonates of the above-mentioned compounds include a compound represented by the general formula (VII)

$$(VII)$$

wherein $R^1$ and $R^2$ are the same as defined above, a compound represented by the general formula (VIII)

$$(VIII)$$

wherein $R^2$ and $Ar^1$ are the same as defined above, a compound represented by the general formula (IX)

$$(IX)$$

wherein $R^1$ and $Ar^2$ are the same as defined above, and a compound represented by the general formula (X)

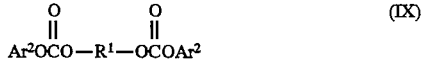
$$(X)$$

wherein $Ar^1$ and $Ar^2$ are the same as defined above.

In the present invention, any of the above-mentioned compounds can suitably be selected and used as the dihydroxy compound of the component (A), but, of the above-mentioned compounds, bisphenol A which is the aromatic dihydroxy compound is preferable. Bisphenol A may be used in the form of an addition compound of bisphenol A and a phenol, or a mixture of this addition compound of a phenol. The employment of such an addition compound permits the supply of high-purity bisphenol A, which is effective for the present invention.

On the other hand, in the present invention, various kinds of carbonic acid diesters can be used as the component (B). For example, the carbonic acid diester is at least one compound selected from the group consisting of carbonic acid diaryl compounds, carbonic acid dialkyl compounds and carbonic acid alkylaryl compounds.

The carbonic acid diaryl compound which can be used as one of this component (B) is a compound represented by the general formula (XI)

$$(XI)$$

wherein $Ar^2$ is the same as defined above, or a compound represented by the general formula (X)

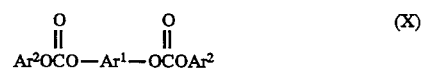
$$(X)$$

wherein $Ar^1$ and $Ar^2$ are the same as defined above. The carbonic acid dialkyl compound is a compound represented by the general formula (XII)

$$(XII)$$

wherein $R^2$ is the same as defined above, or a compound represented by the general formula (VIII)

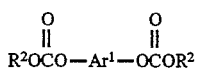 (VIII)

wherein $R^2$ and $Ar^1$ are the same as defined above. The carbonic acid alkylaryl compound is a compound represented by the general formula (XIII)

 (XIII)

wherein $R^2$ and $Ar^2$ are the same as defined above, or a compound represented by the general formula (XIV)

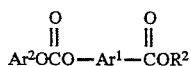 (XIV)

wherein $R^2$, $Ar^1$ and $Ar^2$ are the same as defined above.

Here, typical examples of the carbonic acid diaryl compound include diphenyl carbonate, ditolyl carbonate, bis(chlorophenyl) carbonate, m-cresyl carbonate, dinaphthyl carbonate, bis(diphenyl) carbonate and bisphenol A bisphenyl carbonate.

Typical examples of the carbonic acid dialkyl compound include diethyl carbonate, dimethyl carbonate, dibutyl carbonate, dicyclohexyl carbonate and bisphenol A bismethyl carbonate.

Furthermore, typical examples of the carbonic acid alkylaryl compound include methylphenyl carbonate, ethylphenyl carbonate, butylphenyl carbonate, cyclohexylphenyl carbonate and bisphenol A methylphenyl carbonate.

In the present invention, as the carbonic acid diester which is the component (B), any of the above-mentioned compounds can be selected and used, but among these compounds, diphenyl carbonate is preferable.

The preparation method of the present invention intends to obtain a polycarbonate in accordance with the ester exchange reaction by the use of the above-mentioned components (A) and (B).

In preparing the polycarbonate by the utilization of this ester exchange reaction, the following terminator can be used, if necessary, in addition to the above-mentioned components (A) and (B).

Typical examples of the terminator include o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclo-hexylphenol, p-cyclohexylphenol, o-phenylphenol, m-phenyl-phenol, p-phenylphenol, o-n-nonylphenol, m-n-nonylphenol, p-n-nonylphenol, o-cumylphenol, m-cumylphenol, p-cumyl-phenol, o-naphthylphenol, m-naphthylphenol, p-naphthyl-phenol, 2,6-di-t-butylphenol, 2,5-di-t-butylphenol, 2,4-di-t-butylphenol, 3,5-di-t-butylphenol, 2,5-dicumylphenol and 3,5-dicumylphenol represented by the formulae

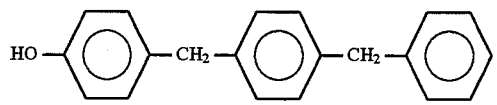

and monovalent phenols such as coumarone derivatives represented by the formulae:

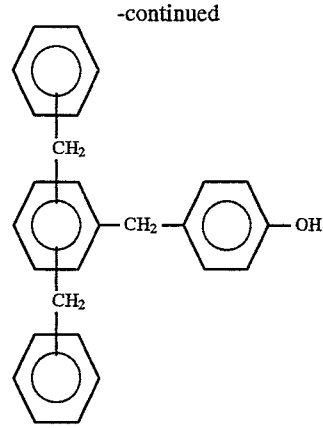

Of these phenols, p-tert-butylphenol, p-cumylphenol and p-phenylphenol are preferable, which are not particularly limited in the present invention.

In addition, compounds represented by the following formulae are also usable as the terminator:

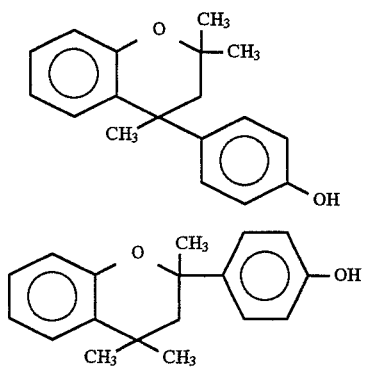

$C_nH_{2n+1}-OH$ wherein n is an integer of 7 to 30.

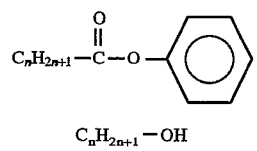

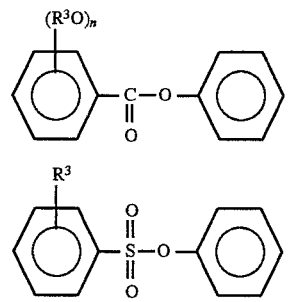

In the present invention, a branching agent can also be used, if necessary, and examples of the branching agent include phloroglucin, trimellitic acid, 1,1,1-tris(4-hydroxyphenyl)ethane, 1-[α-methyl-α-(4'-hydroxyphenyl)-ethyl]-4-[α',α'-bis(4"-hydroxyphenyl)ethyl]benzene, α',α', α"-tris(4-hydroxyphenyl)-1,3,5-triisopropylbenzene and isatinbis(o-cresol).

In the present invention, a catalyst is not particularly required, but in order to accelerate the ester exchange reaction, a known catalyst may be used. Typical examples of such a catalyst include simple substances, oxides, hydroxides, amide compounds, alcoholates, phenolates of alkali metals and alkaline earth metals, basic metallic oxides such as ZnO, PbO and $Sb_2O_3$, organic titanium compounds, soluble manganese compounds, acetates of Ca, Mg, Zn, Pb, Sn, Mn, Cd and Co, combined catalysts of nitrogen-containing basic compounds and boron compounds, combined catalysts of nitrogen-containing basic compounds and alkali (earth) metal compounds, and combined catalysts of nitrogen-containing basic compounds and alkali (earth) metal compounds and boron compounds.

The preparation process of the present invention is largely characterized by adjusting, to 2 ppm or less, the concentration of oxygen in the reaction system atmosphere in which the ester exchange reaction is carried out.

In general, the ester exchange reaction is done in the atmosphere of an inert gas, and examples of the usable inert gas include a nitrogen gas and rare gases such as argon and helium. These inert gases may be used singly or in a combination of two or more thereof.

In the present invention, the oxygen concentration in the inert gas atmosphere is adjusted to 2 ppm or less, preferably 1 ppm or less, more preferably 0.2 ppm or less, whereby the polycarbonate which is free from residence burn and which is excellent in hydrolysis resistance and color tone can be obtained. If the oxygen concentration is in excess of 2 ppm, the polymer is inconveniently colored.

For the decrease in the oxygen concentration, a method using activated copper or Oxypurge N (trade name, made by GL Science Co., Ltd.) can be utilized.

Even if the inert gas in which the oxygen concentration is 2 ppm or less is used, the object of the present invention cannot be achieved, when air or the like runs into the reaction system in the course of the ester exchange reaction to increase the oxygen concentration in the reaction atmosphere to 2 ppm or more. Therefore, the oxygen concentration in the reaction atmosphere is required to be adequately controlled by an oxygen concentration measuring device or the like.

In carrying out the ester exchange reaction in accordance with the present invention, the oxygen concentration in the atmosphere in which the ester exchange reaction is done is adjusted to 2 ppm or less, and the pressure in the system is set to atmospheric pressure or an increased pressure at an early stage of the reaction and is set to a reduced pressure in a second half of the reaction, whereby the polycarbonate can efficiently be obtained.

Here, the early stage of the reaction means a stage where a reaction temperature at which the ester exchange reaction is done is in the range of 100° to 220° C., and the second half of the reaction means a period after the above-mentioned early stage.

Concretely, in the preparation process of the present invention, the reaction may be allowed to proceed in accordance with a known ester exchange reaction under the above-mentioned conditions. Next, reference will be made to the procedure and conditions of the preparation process of the present invention.

In the first place, the dihydroxy compound of the component (A) and the carbonic acid diester of the component (B) are fed in a molar ratio of the carbonic acid diester to the dihydroxy compound in the range of 1 to 1.5, followed by the usual ester exchange reaction. Under certain circumstances, it is preferred that the amount of the carbonic acid diester is in a little excess of that of the dihydroxy compound, i.e., the above-mentioned molar ratio is in the range of 1.02 to 1.20.

In the above-mentioned ester exchange reaction, if the amount of the existing terminator comprising the above-mentioned monovalent phenol or the like is present in the range of 0.05 to 10 mol % per mol of the dihydroxy compound which is the component (A), the hydroxyl group terminal of the obtained polycarbonate is sealed, so that the polycarbonate having sufficiently excellent heat resistance and water resistance can be obtained.

Such a terminator comprising the above-mentioned monovalent phenol may all previously be added to the reaction system. Alternatively, a part of the terminator may previously be added thereto, and the remainder may be added with the proceeding of the reaction. Furthermore, in a certain case, after the ester exchange reaction of the dihydroxy compound of the component (A) and the carbonic acid diester of the component (B) has proceeded to some extent, all of the terminator may be added to the reaction system.

In carrying out the ester exchange reaction in accordance with the process of the present invention, the oxygen concentration in the atmosphere in which the ester exchange reaction is done is adjusted to 2 ppm or less, but no particular restriction is put on reaction temperature. Nevertheless, it is usually in the range of 100° to 330° C., preferably 180° to 300° C., and more preferably, the temperature is gradually elevated up to 180° to 300° C. with the proceeding of the reaction. If the reaction temperature is less than 100° C., the proceeding of the ester exchange reaction is slow, and if it is more than 330° C., the heat deterioration of the polymer occurs inconveniently.

Moreover, reaction pressure depends upon the vapor pressure of a used monomer and reaction temperature. No particular restriction is put on the reaction pressure, and any reaction pressure is acceptable, so far as the reaction can efficiently be carried out. Usually, at an early stage of the reaction, the reaction pressure is set in the range of atmospheric pressure to an increased pressure of 1 to 50 atm (760 to 38,000 torr), and in the second half of the reaction, the reaction pressure is set to a reduced pressure, preferably finally 0.01 to 100 torr.

In addition, reaction time is a time taken to attain a desired molecular weight, and it is usually in the range of about 0.2 to 10 hours.

The above-mentioned reaction is carried out in the absence of an inert solvent, but if necessary, the reaction may be done in the presence of the inert solvent in an amount of 1 to 150% by weight of the obtained PC. Here, examples of the inert solvent include aromatic compounds such as diphenyl ether, halogenated diphenyl ether, benzophenone, polyphenyl ether, dichlorobenzene and methyl-naphthalene, gases such as carbon dioxide, carbon monoxide and nitrogen, alkanes such as chlorofluorohydrocarbons, ethane and propane, cycloalkanes such as cyclohexane, tricyclo(5, 2,10)-decane, cyclooctane and cyclodecane, and alkenes such as ethene and propene.

In the present invention, an antioxidant may be used, if necessary. Typical examples of the antioxidant include phosphorus-containing antioxidants such as tris-(nonylphenyl) phosphite, trisphenyl phosphite, 2-ethylhexyldiphenyl phosphite, trimethyl phosphite, triethyl phosphite, tricresyl phosphite and triaryl phosphite.

In the present invention, phenols and alcohols corresponding to the used carbonic acid diester, their esters and the inert solvent are eliminated with the proceeding of the reaction. These eliminated substances can be separated, purified and recycled, and therefore facilities for removing them are preferably installed.

The process of the present invention can be carried out by a batch system or a continuous system, and optional devices can be used. In the case of the preparation by the continuous system, it is preferred that two or more reactors are used and the above-mentioned reaction conditions are set.

The inside wall of the reactor which can be used in the present invention is lined with a film of such a material as mentioned above. No particular restriction is put on the structure of the reactor, and any structure is acceptable, so far as it has a usual stirring function. In the second half of the reaction, however, viscosity increases, and so the reactor having a high-viscosity type stirring function is preferable. With regard to the shape of the reactor, not only a tank type reactor but also an extruder type reactor can be used.

The thus obtained PC may directly be granulated or molded through an extruder.

To the PC obtained by the present invention, well-known additives can be added, and examples of the additives include a plasticizer, a pigment, a lubricant, a releasing agent, a stabilizer and an inorganic filler.

Furthermore, the obtained PC can be blended with a polymer such as a polyolefin, a polystyrene, a polyester, a polysulfonate, a polyamide or a polyphenylene oxide. In particular, it is effective to use the PC together with a polyphenylene ether, a polyether nitrile, a terminal-modified polysiloxane compound, a modified polypropylene or a modified polystyrene having an OH group, a COOH group, an $NH_2$ group or the like at a terminal.

Next, the present invention will be described in more detail with reference to examples and comparative examples. However, the scope of the present invention should not be limited to these examples at all.

EXAMPLE 1

In a 1.4-liter nickel steel autoclave (equipped with a stirrer) were placed 228 g (1.0 mol) of bisphenol A (BPA) and 257 g (1.2 mol) of diphenyl carbonate, and the autoclave was then purged with nitrogen 5 times. Afterward, the mixture was heated up to 180° C. to melt bisphenol A and diphenyl carbonate.

Next, 2.5 mg ($1 \times 10^{-5}$ mol) of $(C_4H_9)_4NBH_4$ was added as a catalyst. The temperature of the mixture was then raised up to 220° C., and simultaneously stirring was started and a nitrogen gas having an oxygen concentration of 2 ppm was slightly introduced thereto. At this time, produced phenol began to be distilled off. The temperature of the reaction product was maintained at 220° C. for 4 hours.

Afterward, the temperature was gradually raised from 220° C. to 280° C. over 1 hour and simultaneously a vacuum degree was increased to remove the remaining diphenyl carbonate and to advance an ester exchange reaction. Finally, while pressure was maintained at 0.5 torr, the solution was stirred for 1 hour to carry out reaction. In consequence, a viscous transparent condensate (PC) could be obtained in the autoclave.

The thus obtained viscous transparent condensate was dissolved in methylene chloride, and its viscosity-average molecular weight was then measured.

Furthermore, the obtained viscous transparent condensate was ground and then pelletized at 270° C. by the use of an extruder. The obtained pellets were press-molded, and for the thus molded press plates (thickness=3 mm), YI (yellow index), hydrolysis resistance and residence burn were determined.

EXAMPLE 2

The same procedure as in Example 1 was repeated except that a nitrogen gas having an oxygen concentration of 2 ppm in Example 1 was replaced with a nitrogen gas having an oxygen concentration of 1 ppm.

EXAMPLE 3

The same procedure as in Example 1 was repeated except that a nitrogen gas having an oxygen concentration of 2 ppm in Example 1 was replaced with a nitrogen gas having an oxygen concentration of 0.2 ppm.

EXAMPLE 4

The same procedure as in Example 3 was repeated except that a nitrogen gas having an oxygen concentration of 0.2 ppm in Example 3 was passed through a purifying tower filled with activated copper.

As a result, the oxygen concentration was 0.1 ppm or less.

EXAMPLE 5

The same procedure as in Example 3 was repeated except that a nitrogen gas having an oxygen concentration of 0.2 ppm in Example 3 was passed through a purifying tower filled with Oxypurge N (trade name, made by GL Science Co., Ltd.).

As a result, the oxygen concentration was 0.1 ppm or less.

EXAMPLE 6

The same procedure as in Example 1 was repeated except that 2.5 mg ($1 \times 10^{-5}$ mol) of $(C_4H_9)_4NBH_4$ in Example 1 was replaced with 0.2 mg ($1 \times 10^{-5}$ mol) of LiOH.

Comparative Example 1

The same procedure as in Example 1 was repeated except that a nitrogen gas having an oxygen concentration of 2 ppm in Example 1 was replaced with a nitrogen gas having an oxygen concentration of 5 ppm.

The measured results of products in Examples 1 to 6 and Comparative Example 1 are shown in Table 1.

TABLE 1

| | Oxygen Conc. (ppm) | Viscosity-Average Molecular weight (Mv) | YI | Hydrolysis Resistance | Residence Burn ($\Delta$YI) |
|---|---|---|---|---|---|
| Example 1 | 2 | 21,500 | 4.9 | Transparent | 3.2 |
| Example 2 | 1 | 20,700 | 2.2 | Transparent | 2.8 |
| Example 3 | 0.2 | 18,800 | 1.6 | Transparent | 1.9 |
| Example 4 | <0.1 | 19,400 | 1.5 | Transparent | 1.4 |
| Example 5 | <0.1 | 18,900 | 1.4 | Transparent | 1.2 |
| Example 6 | 2 | 22,900 | 5.0 | Slightly cloudy | 5.4 |
| Comp. Ex. 1 | 5 | 19,800 | 10.5 | Transparent | 14.6 |

The above-mentioned oxygen concentration, viscosity-average molecular weight, YI, hydrolysis resistance and residence burn were determined as follows.

(1) Oxygen concentration

The oxygen concentration was measured by the use of a portable trace oxygen analyzer made by Teledyne Analytical Instruments Co., Ltd.

(2) Viscosity-average molecular weight (Mv)

A viscosity of a methylene chloride solution at 20° C. was measured by a Ubbelohde's viscometer, and from the measured viscosity, an intrinsic viscosity [η] was obtained. Next, the desired viscosity-average molecular weight (Mv) was calculated on the basis of the formula:

$$[\eta] \times 1.23 \times 10^{-5} \times Mv^{0.83}$$

(3) YI (Yellow Index)

The YI was measured in accordance with JIS K-7103-77 by the use of a color meter SM-3 [Suga Tester Co., Ltd.].

(4) Hydrolysis resistance

The hydrolysis resistance was judged by visually observing a press plate (thickness=3 mm) exposed to steam at 121° C. for 48 hours.

(5) Residence burn

The residence burn was judged on the basis of a difference between a YI value at the time of molding at 320° C. and a YI value at the molding after residence for 20 minutes in a cylinder.

POSSIBILITY OF INDUSTRIAL UTILIZATION

According to the present invention, there can be prepared a polycarbonate which is free from residence burn and which is excellent in quality and color tone without impairing its hydrolysis resistance by adjusting the concentration of oxygen in an atmosphere where an ester exchange reaction is carried out. Therefore, the present invention can be effectively and widely utilized as the process for industrially advantageously preparing the polycarbonate by the ester exchange method.

We claim:

1. A process for preparing a polycarbonate from a dihydroxy compound (A) and a carbonic acid diester (B) by ester exchange, said process comprising the step of controlling, to 1 ppm or less, the concentration of oxygen in the atmosphere in which an ester exchange reaction is carried out.

2. The process for preparing a polycarbonate according to claim 1 wherein the concentration of oxygen in the atmosphere in which the ester exchange reaction is carried out is 0.2 ppm or less.

3. The process for preparing a polycarbonate according to claim 1 wherein the dihydroxy compound (A) is 2,2-bis(4-hydroxyphenyl)propane.

4. The process for preparing a polycarbonate according to claim 1 wherein the carbonic acid diester (B) is diphenyl carbonate.

5. The process for preparing a polycarbonate according to claim 1 wherein the dihydroxy compound (A) is 2,2-bis(4-hydroxyphenyl)propane and the carbonic acid diester (B) is diphenyl carbonate.

6. The process for preparing a polycarbonate according to claim 1 wherein in carrying out the ester exchange reaction, an inert gas is used in which the oxygen concentration is 1 ppm or less.

7. The process for preparing a polycarbonate according to claim 1 wherein the pressure in a reaction system is set in the range of atmospheric pressure to an increased pressure at an early stage of the ester exchange reaction and is set to a reduced pressure in a second half of the ester exchange reaction.

8. The process for preparing a polycarbonate according to claim 1, wherein the temperature of the ester exchange reaction ranges from 100° to 330° C.

9. The process for preparing a polycarbonate according to claim 8, wherein said reaction temperature ranges from 180° to 300° C.

10. The process for preparing a polycarbonate according to claim 9, wherein the temperature of the ester exchange reaction is gradually elevated to said temperature range of 180° to 300° C. as the reaction proceeds.

11. The process for preparing a polycarbonate according to claim 7, wherein the increased pressure ranges from 1 to 58 atm in early stages of the ester exchange reaction and, during the latter stage of reaction, the pressure is reduced to within the range of 0.01 to 100 torr.

12. The process for preparing a polycarbonate according to claim 1, wherein the molar ratio of the carbonic acid diester (b) to the dihydroxy compound (A) ranges from 1 to 1.5.

13. The process for preparing a polycarbonate according to claim 12, wherein said molar ratio is within the range of 1.02 to 1.20.

14. The process for preparing a polycarbonate according to claim 1, wherein the ester exchange is conducted in the presence of a terminator present in an amount ranging from 0.05 to 10 mole % per mole of dihydroxy compound (A).

15. The process for preparing a polycarbonate according to claim 14, wherein said terminator is a monovalent phenol.

* * * * *